May 5, 1936.  C. A. DOPP ET AL  2,039,523
LUBRICATED COCK
Filed Nov. 17, 1933    2 Sheets-Sheet 1
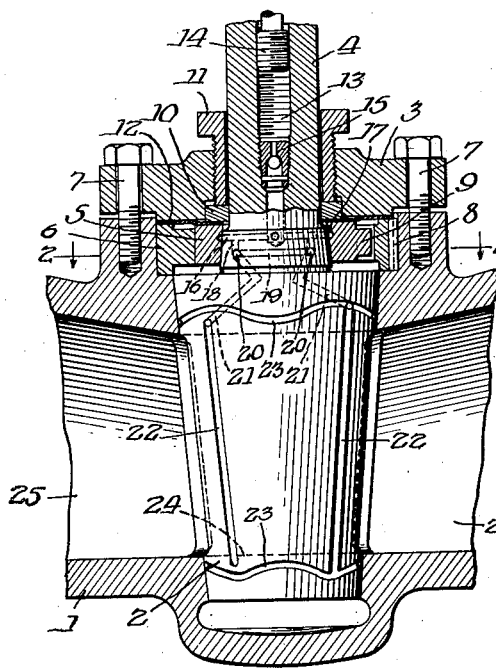
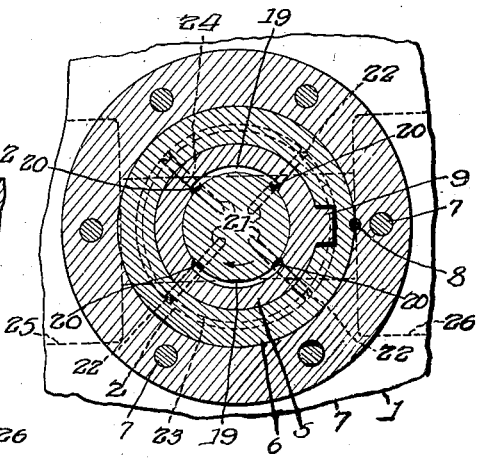
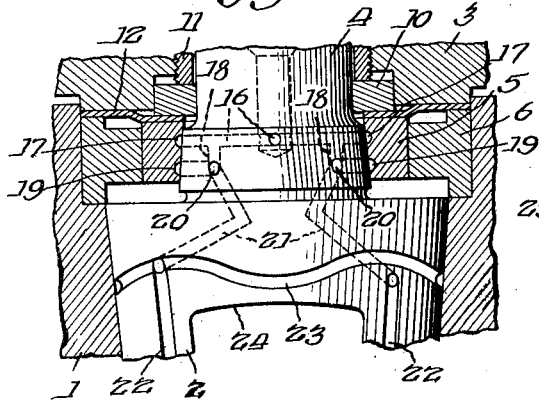
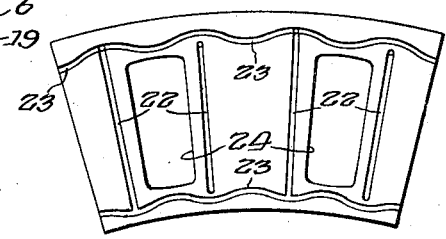
Witness:
R. B. Davison.
Inventors:
Carl A. Dopp +
Richard Fennema
By Ira J. Wilson Atty May 5, 1936.                C. A. DOPP ET AL                2,039,523
                              LUBRICATED COCK
                           Filed Nov. 17, 1933              2 Sheets-Sheet 2
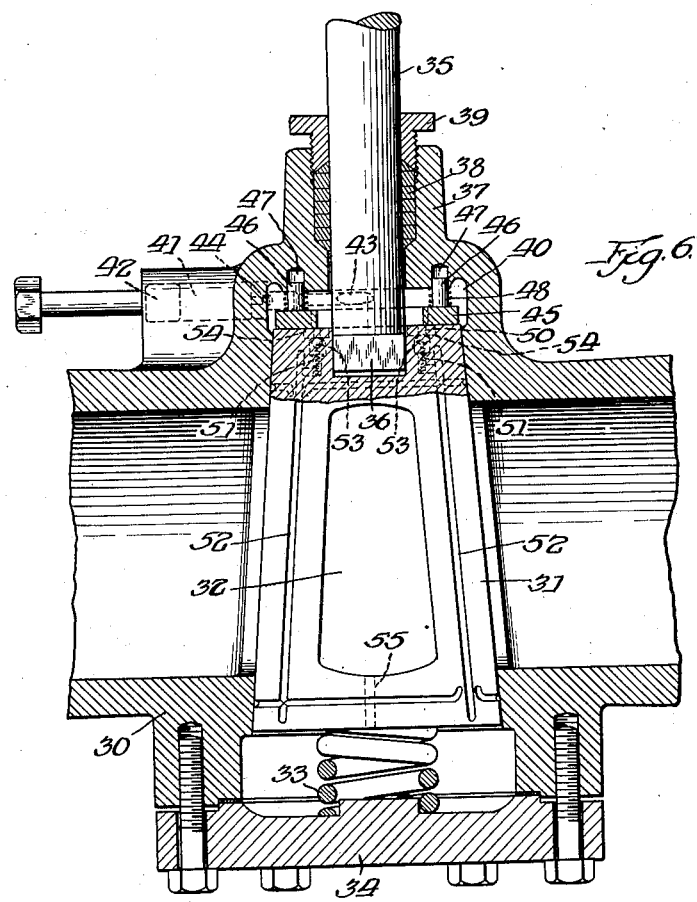
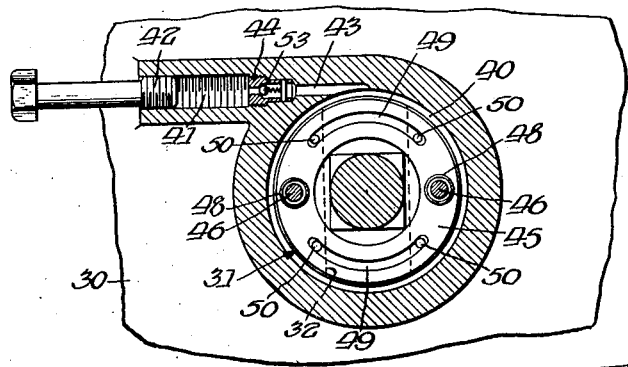
Witness:
R. B. Davison.
Inventors:
Carl A. Dopp &
Richard Fennema.
By Ira J. Wilson, Atty.

Patented May 5, 1936

2,039,523

UNITED STATES PATENT OFFICE 2,039,523

LUBRICATED COCK

Carl A. Dopp and Richard Fennema, Chicago, Ill., assignors to Crane Co., Chicago, Ill., a corporation of Illinois Application November 17, 1933, Serial No. 698,472

9 Claims. (Cl. 251—93)

This invention relates to plug valves or cocks of the type equipped with means for supplying lubricant to the seating surfaces of the valve plug and valve body, so as to prevent sticking of the plug and to enable it to be readily turned after it has remained for a considerable time in one position.

The efficient distribution of lubricant to the seating surfaces of the valve plug and body of a cock requires a system of grooving comprising at least four longitudinal grooves equally spaced, so that when the valve plug is in either open or closed position the lubricant is supplied longitudinally of the plug along each side of each of the two seat ports or openings formed in the seating surface of the body where it intersects with the fluid passage through the body. Rotation of the plug from open to closed position or from closed to open position brings two of said lubricant distributing grooves which are diametrically opposite to a position where they are exposed in the fluid passage of the cock body, and unless these grooves while so exposed are disconnected from the source of lubricant supply the lubricant pressure on the system is lost, and any additional lubricant forced into the system while the plug is in an intermediate or throttling position will enter the pipe line through said exposed grooves. To prevent this, various schemes have been employed for cutting off the supply of lubricant to the grooves which are exposed in the intermediate position of the plug, and in general these have depended upon a system of grooves arranged partly in the seating surface of the plug and partly in the seating surface of the valve body.

The present invention, differing from such prior art devices, contemplates a construction in which the lubricant distributing grooves, which may be wholly in the seating surface of the plug, are connected with the source of lubricant supply by means disassociated from said seating surfaces, in the form of a simple grooved or slotted ring arranged between one end of the plug and the body, its location depending upon the particular construction of cock to which the invention is applied and upon the location of the lubricant reservoir, and which controls the connections in such manner as to cut off the supply of lubricant to the grooves which are exposed when the plug is turned to or through an intermediate position. The invention, which is applicable to various conventional types of cocks, further includes a construction whereby the end thrust on the tapered plug due to pressure of lubricant between the seating surfaces of the plug and body is balanced by lubricant pressure between such ring and the plug stem, the coacting surfaces of the ring and plug stem being tapered in opposition to the taper of the plug and its seat. Other specific features of construction and advantages involved in the invention will be apparent from the following description, taken in connection with the accompanying drawings.

In the drawings:

Fig. 1 is a sectional view of a cock of one practicable construction embodying the invention, the plug being in open position and shown in elevation.

Fig. 2 is a horizontal section taken on the line 2—2 of Fig. 1 and looking downward.

Fig. 3 is a detail vertical section taken at right angles to Fig. 1.

Fig. 4 is a detail section of a lubricant cut-off ring employed in the construction shown in the preceding views.

Fig. 5 represents a development of the seating surface of the plug.

Fig. 6 is a sectional view of another construction of cock containing an embodiment of the invention.

Fig. 7 is a horizontal section of Fig. 6, taken through the lubricant chamber thereof and showing the lubricant cut-off ring thereof in plan view.

Referring to Fig. 1, the valve body 1, the rotatable plug 2 seated therein, and the bonnet 3 through which the plug stem 4 extends are conventional parts of a well known type of cock. Seated on a conical surface of the plug stem is a lubricant cut-off ring 5 which in this instance is enclosed by a ring 6 fitted in the valve body and clamped between the plug and bonnet, the latter being attached to the body by the usual stud screw 7. The ring 6 is secured against rotation by the pin 8 (Fig. 2). The ring 5 is held non-rotatably in the ring 6 but is susceptible of axial adjustment by virtue of the external lug 9 on the former slidably engaging a vertical keyway in the latter. The lubricant cut-off ring 5 is held to its conical seat on the valve stem, with desired pressure, by means of a tubular gland nut 11 screwed into the bonnet against a ring 10 which bears against the ring 5. A suitable gasket 12 preferably comprising layers of metal and fabric composition is clamped between the parts 3, 10 and the parts 5, 6. The ring 10 may have external and internal lugs (not shown) coacting with recesses in the bonnet and plug stem to hold the ring stationary and to limit the plug to a rotation of 90°, in accordance with the principle explained in the Flodin Patent No. 1,875,302 of August 30, 1932.

The plug stem is longitudinally bored to provide a lubricant reservoir 13 in which works a compressor or feed screw 14 for forcing the feed of lubricant to the valve seating surfaces. Below the feed screw the reservoir is divided by a check valve unit 15, the check valve of which works inwardly or toward the valve so as to prevent backing up of lubricant. The lower end of the reservoir below the check valve is in communication by four radial ducts 16 with a circumferential groove 17 formed in the inner surface of the ring 5. Said groove 17 is connected by four short grooves 18 with the ends of two diametrically opposite quadrantal grooves 19 formed in said inner surface of the ring below the circumferential groove 17. When the valve plug is either in the open or closed position, the ends of said quadrantal grooves register with the inlets 20 of four ducts 21 in the valve plug, and these ducts lead respectively to the upper ends of longitudinal lubricant distributing grooves 22 in the seating surface of the valve plug. There should preferably be four of such grooves 22, equally spaced and symmetrically disposed at opposite sides of the plug port 24, so that in either the open or closed position of the plug each of the seat ports or openings in the seating surface of the valve body is between a pair of such grooves. The grooves 22 may be supplemented by additional grooving to provide substantially complete grease seals around the seat ports or in other words around the passage through the valve body at each side of the plug.

Referring to Fig. 2, it will be observed that when the plug is in open position, i. e., with its port 24 in registration with the seat ports for establishing communication between the inlet and outlet sides 25 and 26 of the body passage, a pair of ducts 21 at one side of the plug port is connected by one of the quadrantal grooves 19, and the other diametrically opposite pair of ducts 21 is connected by the other quadrantal groove, so that lubricant may be fed from the source of supply to all of the four lubricant distributing grooves 22 to which the ducts 21 lead. Rotation of the plug from open position, in the direction of the arrow indicated in Fig. 2, will move diametrically opposite ducts 21 out of communication with said quadrantal grooves, thus cutting off the supply of lubricant to two diametrically opposite lubricant distributing grooves 22, namely those which in the intermediate position of the plug are exposed to the fluid passing through the cock. When the valve is in the closed position, namely at right angles to the position shown in Fig. 2, then the four lubricant distributing grooves 22 are again connected with the source of supply, due to the fact that the holes 20 which moved away from one end of the quadrantal grooves 19 are brought into registration with the other ends thereof. Thus the grooved ring 5 functions as a cut-off slide valve whereby the four holes 20 in the conical surface of the plug stem, forming the inlets of the ducts 21, are connected in pairs one way when the plug is in open position and another way when the plug is in closed position, while in the intermediate position the ducts which lead to those grooves which are exposed are moved from the quadrantal grooves, hence cutting off the supply of lubricant to the two diametrically opposite lubricant distributing grooves which are exposed. It will be observed that the arcuate lengths of the quadrantal grooves are slightly greater than 90°, the slight excess in length being equivalent to one-half the diameter of the equally spaced holes 20, assuming said holes to be bored to the same diameter.

The ring 5, typifying a cut-off device which may be arranged between the housing and upper or lower end of the valve plug, according to the construction of the cock and location of the lubricant reservoir, provides an inexpensive and efficient means for controlling the connections between the lubricant distributing valves and the source of supply, in such manner as to perform the necessary cut-off function; and such a device can be fitted in any conventional type of cock body with little requirement for additional space.

In the construction shown in Figs. 1, 2, and 3, wherein the grooved surface of the ring 5 is fitted to a conical surface on the valve stem, corresponding in taper to the tapered seating surfaces of the valve plug and body but tapered in the opposite direction, and because the lubricant is supplied between the tapered surfaces of the ring 5 and valve stem by an arrangement of grooving whereby there is a considerable amount of lubricant between these surfaces, the end thrust on the plug which is caused by lubricant pressure between it and its seat is opposed by the lubricant pressure between the ring 5 and valve stem, thus balancing or tending to balance the first mentioned thrust by a thrust in the opposite direction, and reducing tendency for lubricant pressure to cause a binding of the plug.

The employment of the two rings 5 and 6, instead of employing a single larger ring for the cut-off device, is of practical advantage since in manufacture it permits a greater flexibility in allowing for machining inaccuracies, considering that the machining of the parts involves work on two tapers, that for the plug and its seat and that for lubricant cut-off device, which makes it necessary to allow the ring 5 to bear properly on the tapered surface of the valve stem without respect to the fixed distances between the plug and the bonnet. With the two ring construction shown, having the outer ring clamped between the plug and bonnet and held in its proper angular position by the pin 8, and having the inner ring held non-rotatably but vertically adjustably in the outer ring, the correct adjustment of the inner ring or washer 5 can be obtained independently of the fixed position of the outer ring 6.

In connection with the longitudinal lubricant distributing grooves 22 in the seating surface of the plug, various arrangements of supplemental lubricant distributing grooves may be employed; for example as shown in Fig. 1 and in the development of the plug seating surface shown in Fig. 5, the longitudinal grooves which are unexposed in the intermediate position of the valve plug may each be connected with upper and lower circumferential grooves 23, so as to provide complete grease seals around the passage-way through the body at each side of the plug when the plug is in either open or closed position; however the exposed grooves should have no connection with the others. If desired, the circumferential grooves 23 may be interrupted, so as to keep all the longitudinal grooves isolated from one another.

Referring to Figs. 6 and 7, which show an embodiment of the invention in its broader aspects in a plug valve of different construction from that shown in the preceding figures, 30 denotes the valve body in which is seated the tapered rotatable plug 31, having the transverse port 32;

the plug in this instance having its smaller end uppermost and being held to its seat by spring and line pressure, the spring pressure being obtained by means of the spring 33 reacting between the lower end of the plug and the cap 34 which is attached to the valve body and closes the body opening through which the plug is inserted, and the line pressure being obtained in the spring chamber by means of a port 55 establishing communication between said chamber and the plug port 32. The plug stem 35, having a lower squared end 36 which is secured in a square socket in the upper end of the plug, is enclosed by a stuffing box 37 formed in the upper part of the valve body and containing packing 38 compressed by the gland 39.

Between the upper end of the plug and upper part of the body is a grease chamber 40 to which lubricant is supplied from a reservoir 41 formed in the body, said reservoir containing the compressor or feed screw 42 for forcing the lubricant to said chamber and to the seating surfaces of the valve. The reservoir communicates by the duct 43 with the grease chamber, and an inwardly opening check-valve 44 prevents the backing up of the lubricant under the pressure which may exist in the chamber 40 and between the seating surfaces of the valve plug and body.

Communication between the grease chamber and the lubricant distributing grooves of the valve is controlled by a flat slotted washer 45 seated on the upper end of the valve plug, said washer being held from rotation by the vertical pins 46 which project from the washer and are slidably fitted in suitable sockets or holes 47 in the top part of the valve body. Springs 48 surrounding the pins and reacting between the body and washer hold the washer firmly to the lubricant cut-off seat on the upper end of the plug.

The washer has two diametrically opposite arcuate or quadrantal slots 49 so located that when the valve plug is in either open or closed position the end portions of said slots are in registration with the four equally spaced holes 50 in the seating surface for the washer on the upper end of the plug. These holes 50 are the inlets to the four ducts 51 in the valve plug leading respectively to the four equally spaced longitudinal lubricant distributing grooves 52 in the seating surface of the valve plug. As will be obvious, two diametrically opposite holes 50 will always be in register with the quadrantal slots, but when the valve plug is in an intermediate position the other two will be out of register, thus cutting off the supply of lubricant from the two diametrically opposite lubricant distributing grooves 52 which are exposed in the fluid space of the valve body.

As shown in Fig. 6, the ducts 51 may be provided with inwardly opening check valves 53, for which purpose the holes 50 are formed in bushings 54 screwed into the upper end of the valve plug, the lower ends of said bushings providing seats for the spring actuated ball check valves 53.

It will be understood that the illustrative constructions are exemplary, and that the details thereof may be variously modified within the scope of the invention.

The invention in its broader aspects and features is not limited to constructions and lubricant distributing systems of the specific character disclosed, since various features of the invention may be variously used in different specific combinations and sub-combinations; and in this connection attention is called to the broad features of a cock lubricating system in which the cut-off function is performed by means disassociated from the seating surfaces of the cock and body, a lubricating system in which the end thrust imposed on the plug by lubricant pressure is counteracted by opposing thrust produced by lubricant pressure, and system in which with the accompanying cut-off function the entire series of lubricant distributing grooves may be in the seating surface of the plug.

What we claim as our invention, and desire to secure by Letters Patent, is:

1. A lubricated cock comprising a body, a rotatable ported plug seated therein, separate lubricant distributing grooves in the seating surface of the plug arranged longitudinally thereof at both sides of its port at each end thereof, a stationary ring located at one end of the plug and having a surface bearing on a coacting surface of the plug, a lubricant reservoir, diametrically opposite quadrantal lubricant receiving recesses in said ring in communication with said reservoir, said surface of the plug on which the ring bears being exposed to said quadrantal recesses, ports in said last mentioned surface in registration with the end portions of the quadrantal recesses when the plug is in open or closed position, and ducts in the plug leading from said ports to said lubricant distributing grooves, whereby said grooves are all connected with the source of lubricant supply when the plug is in open or closed position, while the grooves which are exposed in the fluid passage of the cock when the plug is turned to an intermediate position are disconnected from said source.

2. A lubricated cock comprising a body, a rotatable ported plug seated therein, lubricant distributing grooves in the seating surface of the plug, certain of which are exposed to the fluid passing through the cock when the plug is in an intermediate or throttling position, a stationary ring located between one end of the plug and the body, said ring and plug having coacting surfaces, a lubricant reservoir, said ring having a circumferential groove in the surface thereof which bears on the coacting surface of the plug, ducts in the plug connecting said circumferential groove in the ring with said reservoir, and other ducts in the plug leading from the surface on which the ring bears to said lubricant distributing grooves, said ring having grooves in communication with said circumferential groove and with which said last mentioned ducts connect when the plug is in open or closed position, the arrangement being such that the ring cuts off the supply of lubricant to the ducts leading to the exposed lubricant distributing grooves when the plug is turned to such intermediate position.

3. A lubricated cock comprising a rotatable tapered ported plug, a cock body in which the plug is seated, a system of grooves arranged for distributing lubricant between the seating surfaces of the plug and body, said plug having at one end a conical part the taper of which is opposite to the taper of the plug, a stationary internally grooved ring fitted to said part, a lubricant reservoir carried by the plug, ducts in the plug for conducting lubricant from said reservoir to the internal grooves of the ring, and ducts in the plug for conducting lubricant from said grooves in the ring to said grooves which distribute the lubricant between the seating surfaces of the plug and body, whereby end thrust on the plug by lubricant pressure is counteracted by opposing thrust by lubricant pressure between the ring and said conical part of the plug.

4. A lubricated plug valve of the character set forth in claim 3 wherein the internal grooving of the ring comprises communicating grooves in different planes for effecting a distribution of lubricant under pressure between the surfaces of the ring and said conical part of the plug to more effectually oppose the end thrust on the plug.

5. A lubricated plug valve of the character set forth in claim 3 having a ring enclosing said inner or lubricant cut-off ring, means for clamping said outer ring in the cock body, the inner ring being held non-rotatably by the outer ring but susceptible of vertical adjustment, and means for adjustably holding the inner ring to obtain appropriate pressure for the seating of the inner ring on said conical part of the plug.

6. A lubricated plug valve of the character set forth in claim 3 having a bonnet secured to the body, a plug stem extending through said bonnet and containing said reservoir, said conical part of the plug being at the base of said stem and said ring seated on the larger end of said plug, an outer ring enclosing said inner or first mentioned ring clamped between the plug and bonnet, said inner ring fitted non-rotatably but vertically adjustable in said outer ring, a tubular adjusting nut in the bonnet enclosing the plug stem, and a ring fitted in the bonnet engaged by said nut, the said inner ring being held seated on said conical part of the plug with a pressure determined by said nut.

7. A lubricated cock comprising a rotatable ported plug, a cock body in which the plug is seated, separate lubricant distributing grooves in the seating surface of the plug arranged longitudinally thereof at both sides of the plug port at each end thereof, said plug having at one end thereof a conical part the taper of which is opposite to the taper of the plug, a stationary ring fitted to said conical part, said ring having an internal circumferential groove and two diametrically opposite internal quadrantal grooves communicating with said circumferential groove, ducts in the plug leading to said circumferential groove, ducts in the plug leading from the surface of said conical part enclosed by the ring to said lubricant distributing grooves, the inlets to said ducts being in registration with said quadrantal grooves when the plug is in open or closed position, and means for forcing lubricant into the entire system of lubricant distributing grooves via the first mentioned ducts in the plug and internal grooves of the ring, said ring functioning to disconnect those grooves which are exposed when the plug is in intermediate position from the source of lubricant supply.

8. A lubricated cock comprising a rotatable ported plug, a cock body in which the plug is seated, a lubricant reservoir in the body, there being a grease space in communication with the reservoir between one end of the plug and said body, a segmentally slotted washer seated on said end, ducts in the plug the inlets of which are controlled by said washer, and grooves to which said ducts lead for distributing lubricant between the seating surfaces of the plug and body, the plug being tapered and seated with its smaller end uppermost and having means for holding the plug seated, the said washer being spring seated on the upper end of the plug and having means for spring seating said washer and means for holding the washer non-rotatable.

9. A lubricated cock comprising a body, a rotatable ported plug seated therein, separate lubricant distributing grooves in the seating surface of the plug arranged longitudinally thereof at both sides of its port at each end thereof, a lubricant reservoir in the body, there being a grease space in communication with the reservoir between one end of the plug and said body, a non-rotatable washer bearing on said end of the plug, means holding said washer in contact with the plug, said washer having diametrically opposite quadrantal slots, the end surface of the plug on which the washer bears having ports in registration with the end portions of the quadrantal recesses when the plug is in open or closed position, and ducts in the plug leading from said ports to said lubricant distributing grooves, whereby said grooves are all connected with the source of lubricant supply when the plug is in open or closed position, while the grooves which are exposed in the fluid passage of the cock when the plug is turned to an intermediate position are disconnected from said source.

CARL A. DOPP.
RICHARD FENNEMA.